(12) United States Patent
Hoshino et al.

(10) Patent No.: US 7,977,215 B2
(45) Date of Patent: Jul. 12, 2011

(54) METHOD OF PROCESSING OPTICAL DEVICE WAFER

(75) Inventors: Hitoshi Hoshino, Ota-ku (JP); Takashi Yamaguchi, Ota-ku (JP)

(73) Assignee: Disco Corporation, Tokyo (JP)

( * ) Notice: Subject to any disclaimer, the term of this patent is extended or adjusted under 35 U.S.C. 154(b) by 111 days.

(21) Appl. No.: 12/496,436

(22) Filed: Jul. 1, 2009

(65) Prior Publication Data
US 2010/0035408 A1 Feb. 11, 2010

(30) Foreign Application Priority Data
Aug. 11, 2008 (JP) ................................ 2008-207215

(51) Int. Cl.
*H01L 21/78* (2006.01)
*H01L 21/46* (2006.01)

(52) U.S. Cl. ................ 438/464; 438/463; 257/E21.214; 257/E21.237

(58) Field of Classification Search .................. 438/463, 438/464
See application file for complete search history.

(56) References Cited

U.S. PATENT DOCUMENTS
| 7,601,616 | B2 * | 10/2009 | Morikazu et al. | |
| 7,622,366 | B2 * | 11/2009 | Nakamura | |
| 7,745,311 | B2 * | 6/2010 | Hoshino et al. | 438/463 |
| 2005/0009301 | A1 * | 1/2005 | Nagai et al. | |
| 2006/0003553 | A1 * | 1/2006 | Park et al. | |
| 2009/0124063 | A1 * | 5/2009 | Nakamura | |
| 2009/0142906 | A1 * | 6/2009 | Nakamura | |
| 2009/0197395 | A1 * | 8/2009 | Nakamura et al. | |
| 2009/0215245 | A1 * | 8/2009 | Nakamura | |
| 2009/0298263 | A1 * | 12/2009 | Watanabe et al. | |
| 2009/0311848 | A1 * | 12/2009 | Hoshino et al. | |
| 2010/0035408 | A1 * | 2/2010 | Hoshino et al. | |
| 2010/0041210 | A1 * | 2/2010 | Hoshino et al. | 438/463 |

FOREIGN PATENT DOCUMENTS
| JP | A 10-305420 | 11/1998 |
| JP | A 2008-6492 | 1/2008 |

* cited by examiner

*Primary Examiner* — Alexander G Ghyka
(74) *Attorney, Agent, or Firm* — Greer, Burns & Crain, Ltd.

(57) ABSTRACT

A method of dividing an optical device wafer includes: a laser beam processing step of performing laser beam processing to provide an optical device wafer with breakage starting points along streets on the face side of the optical device wafer; a protective plate bonding step of bonding the face side of the optical device wafer to a surface of a highly rigid protective plate with a bonding agent permitting peeling; a back side grinding step of grinding the back side of the optical device wafer so as to form the optical device wafer to a finished thickness of the optical devices; a wafer supporting step of adhering the back-side surface of the optical device wafer to a surface of a dicing tape, and peeling the protective plate adhered to the face side of the optical device wafer; and a wafer dividing step of exerting an external force on the optical device wafer so as to break up the optical device wafer along the streets along which the breakage starting points have been formed, thereby dividing the optical device wafer into the individual optical devices.

6 Claims, 14 Drawing Sheets

METHOD OF PROCESSING OPTICAL DEVICE WAFER

BACKGROUND OF THE INVENTION

1. Field of the Invention

The present invention relates to a method of processing an optical device wafer by which an optical device wafer having optical devices composed of a gallium nitride compound semiconductor or the like layered in a plurality of regions demarcated by streets formed in a grid pattern on the face-side surface of a substrate such as a sapphire substrate is divided along the streets into the individual optical devices.

2. Description of the Related Art

An optical device wafer in which a plurality of regions are demarcated by planned dividing lines called streets formed in a grid pattern on the face-side surface of a sapphire substrate and optical devices composed of a gallium nitride compound semiconductor or the like are layered in the demarcated regions is divided along the streets into the individual optical devices such as light emitting diodes, which are widely utilized for electric apparatuses. As a method for dividing the optical device wafer along the streets, a method of cutting the optical device wafer by a cutting blade rotated at high speed has been attempted, but it is difficult to cut the sapphire substrate by a cutter, since the sapphire substrate has a high Mohs hardness and is a difficult-to-cut material.

In recent years, as a method for dividing a wafer such as an optical device wafer along streets, there has been proposed a method in which the wafer is irradiated with a pulsed laser beam having such a wavelength as to be absorbed in the wafer along the streets to form laser beam-machined grooves, and an external force is applied along the laser beam-machined grooves so as to break up the wafer along the streets (see, for example, Japanese Patent Laid-open No. Hei 10-305420).

In addition, as a method for dividing a wafer such as an optical device wafer along streets, there has also been proposed a method in which the wafer is irradiated with a pulsed laser beam having such a wavelength as to be transmitted through the wafer along the streets while adjusting the focal point position of the pulsed laser beam to the inside of the wafer, thereby continuously forming an altered layer inside the wafer along the streets, and an external force is exerted along the streets along which the wafer strength has been lowered due to the formation of the altered layer, to break up the wafer along the streets (see, for example, Japanese Patent Laid-open No. 2008-6492).

The optical device wafer as above-mentioned is formed to a predetermined thickness by grinding the back side thereof, prior to division into the individual devices. Besides, in recent years, a reduction of the thickness of optical devices to 50 μm or below is demanded for realizing electric apparatuses reduced in weight and size. When an optical device wafer is ground to a small thickness of 50 μm or below, however, the optical device wafer would be cracked.

SUMMARY OF THE INVENTION

Accordingly, it is an object of the present invention to provide a method of processing an optical device wafer by which an optical device wafer can be thinned, without generation of cracks, and can be divided into individual optical devices.

In accordance with an aspect of the present invention, there is provided a method of processing an optical device wafer, for dividing an optical device wafer which has optical devices formed in a plurality of regions demarcated by a plurality of streets formed in a grid pattern on a face-side surface thereof, along the plurality of streets into the individual optical devices, the method including: a laser beam processing step of irradiating the optical device wafer with a laser beam along the streets so as to perform laser beam processing on the face side of the optical device wafer, thereby forming breakage starting points along the streets; a protective plate bonding step of bonding the face side of the optical device wafer having been subjected to the laser beam processing step to a surface of a highly rigid protective plate with a bonding agent permitting peeling; a back side grinding step of grinding a back side of the optical device wafer adhered to the protective plate to form the optical device wafer to a finished thickness of the optical devices; a wafer dividing step of exerting an external force on the optical device wafer having been subjected to the back side grinding step so as to break up the optical device wafer along the streets along which the breakage starting points have been formed, thereby dividing the optical device wafer into the individual optical devices; a wafer supporting step of adhering a back-side surface of the optical device wafer having been subjected to the wafer dividing step and having been divided into the individual optical devices to a surface of a dicing tape, and peeling the protective plate adhered to the face side of the optical device wafer; and a picking-up step of picking up the individually divided devices adhered to the dicing tape.

In accordance with another aspect of the present invention, there is provided a method of processing an optical device wafer, for dividing an optical device wafer which has optical devices formed in a plurality of regions demarcated by a plurality of streets formed in a grid pattern on a face-side surface thereof, along the plurality of streets into the individual optical devices, the method including: a laser beam processing step of irradiating the optical device wafer with a laser beam along the streets so as to perform laser beam processing on the face side of the optical device wafer, thereby forming breakage starting points along the streets; a protective plate bonding step of bonding the face side of the optical device wafer having been subjected to the laser beam processing step to a surface of a highly rigid protective plate with a bonding agent permitting peeling; a back side grinding step of grinding a back side of the optical device wafer adhered to the protective plate to form the optical device wafer to a finished thickness of the optical devices; a wafer supporting step of adhering a back-side surface of the optical device wafer having been subjected to the back side grinding step to a surface of a dicing tape, and peeling the protective plate adhered to the face side of the optical device wafer; a wafer dividing step of exerting an external force on the optical device wafer having been subjected to the wafer supporting step so as to break up the optical device wafer along the streets along which the breakage starting points have been formed, thereby dividing the optical device wafer into the individual optical devices; and a picking-up step of picking up the individually divided devices adhered to the dicing tape.

Preferably, the laser beam processing step includes irradiating the optical device wafer with a laser beam having such a wavelength as to be transmitted through the optical device wafer while adjusting a focal point position of the laser beam to the inside of the optical device wafer, thereby to form an altered layer as the breakage starting points inside the optical device wafer along the streets.

Alternatively, the laser beam processing step includes irradiating the optical device wafer with a laser beam having such a wavelength as to be absorbed in the optical device wafer, thereby to form laser beam-machined grooves as the breakage starting points in the face-side surface of the optical device wafer along the streets.

According to the present invention, the laser beam processing step of subjecting the optical device wafer to laser beam processing so as to form breakage starting points along the streets is carried out, the protective plate bonding step of bonding the face side of the optical device wafer to a surface of a highly rigid protective plate with a bonding agent permitting peeling is carried out, and thereafter the back grinding step of grinding the back side of the optical device wafer so as to form the optical device wafer to a finished thickness of the optical devices is carried out. Therefore, even when the optical device wafer is ground to a small thickness of, for example, 50 μm or below, the optical device wafer would not be cracked, since the highly rigid protective plate is bonded to the face side of the optical device wafer. The optical device wafer thus ground is divided into the individual optical devices by applying an external force so as to break up the optical device wafer along the breakage starting points formed by the laser beam processing step.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
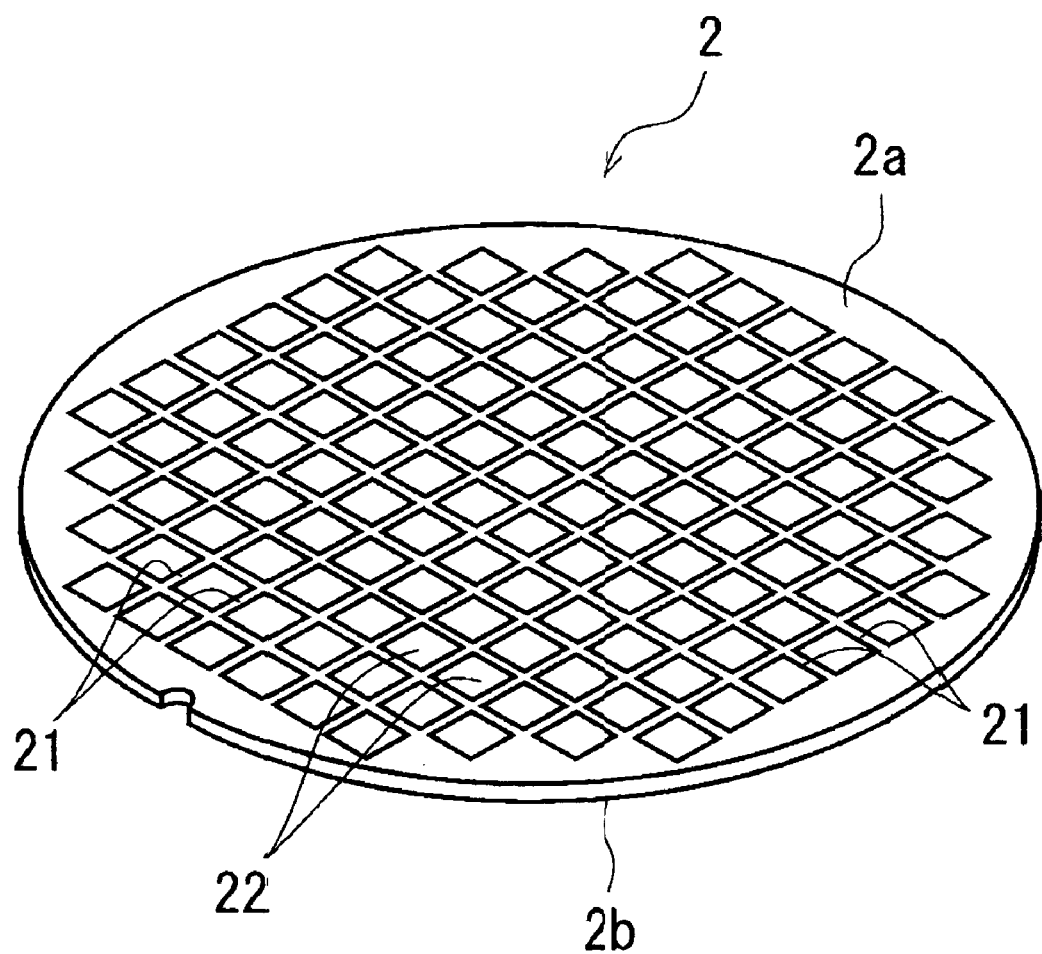
FIG. 1 is a perspective view of an optical device wafer to be divided by the method of processing an optical device wafer according to the present invention.

Now, preferred embodiments of the method of processing an optical device wafer according to the present invention will be described in detail below, referring to the attached drawings. FIG. 1 shows an optical device wafer 2 to be divided by the method of processing an optical device wafer according to the invention. The optical device wafer 2 shown in FIG. 1 has a configuration in which a plurality of regions are demarcated by streets 21 formed in a grid pattern on a face-side surface 2a of a sapphire substrate which, for example, has a diameter of 100 mm and a thickness of 425 μm, and a plurality of optical devices 22 such as light emitting diodes are formed in the demarcated regions.

A first embodiment of the method of processing an optical device wafer for dividing the above-mentioned optical device wafer 2 along the streets 21 into the individual optical devices 22 will be described, referring to FIGS. 2 to 12. In order to divide the optical device wafer 2 along the streets 21 into the individual optical devices 22, first, a laser beam processing step is conducted in which the optical device wafer 2 is irradiated with a laser beam along the streets 21 so as to perform laser beam processing on the optical device wafer 2, thereby forming breakage starting points along the streets 21. The laser beam processing step is carried out by use of a laser beam processing apparatus shown in FIG. 2. The laser beam processing apparatus 3 shown in FIG. 2 includes a chuck table 31 for holding a work to be machined, a laser beam irradiation means 32 for irradiating the work held on the chuck table 31 with a laser beam, and an image pickup means 33 for picking up an image of the work held on the chuck table 31. The chuck table 31 is so configured that it holds the work by suction, it is moved in a machining feed direction indicated by arrow X in FIG. 2 by a machining feeding means (not shown), and it is moved in an indexing feed direction indicated by arrow Y in FIG. 2 by an indexing feeding means (not shown).

The laser beam irradiation means 32 includes a hollow cylindrical casing 321 disposed substantially horizontally. In the casing 321 is disposed a pulsed laser beam oscillation means having a pulsed laser beam oscillator and a repetition frequency setting means (not shown). A condenser 322 for condensing a pulsed laser beam oscillated from the pulsed laser beam oscillator is mounted to a tip part of the casing 321.

The image pickup means 33 attached to a tip part of the casing 321 constituting the laser beam irradiation means 32, in the embodiment shown, is composed of not only an ordinary image pickup device (CCD) for imaging by use of a visible beam but also an infrared illumination means for irradiating the work with infrared rays, an optical system for catching the infrared rays radiated from the infrared illumination means, an image pickup device (infrared CCD) for outputting an electrical signal corresponding to the infrared rays caught by the optical system, and the like, and sends a picture signal indicative of the picked-up image to a control means (not shown).

Figure 2:
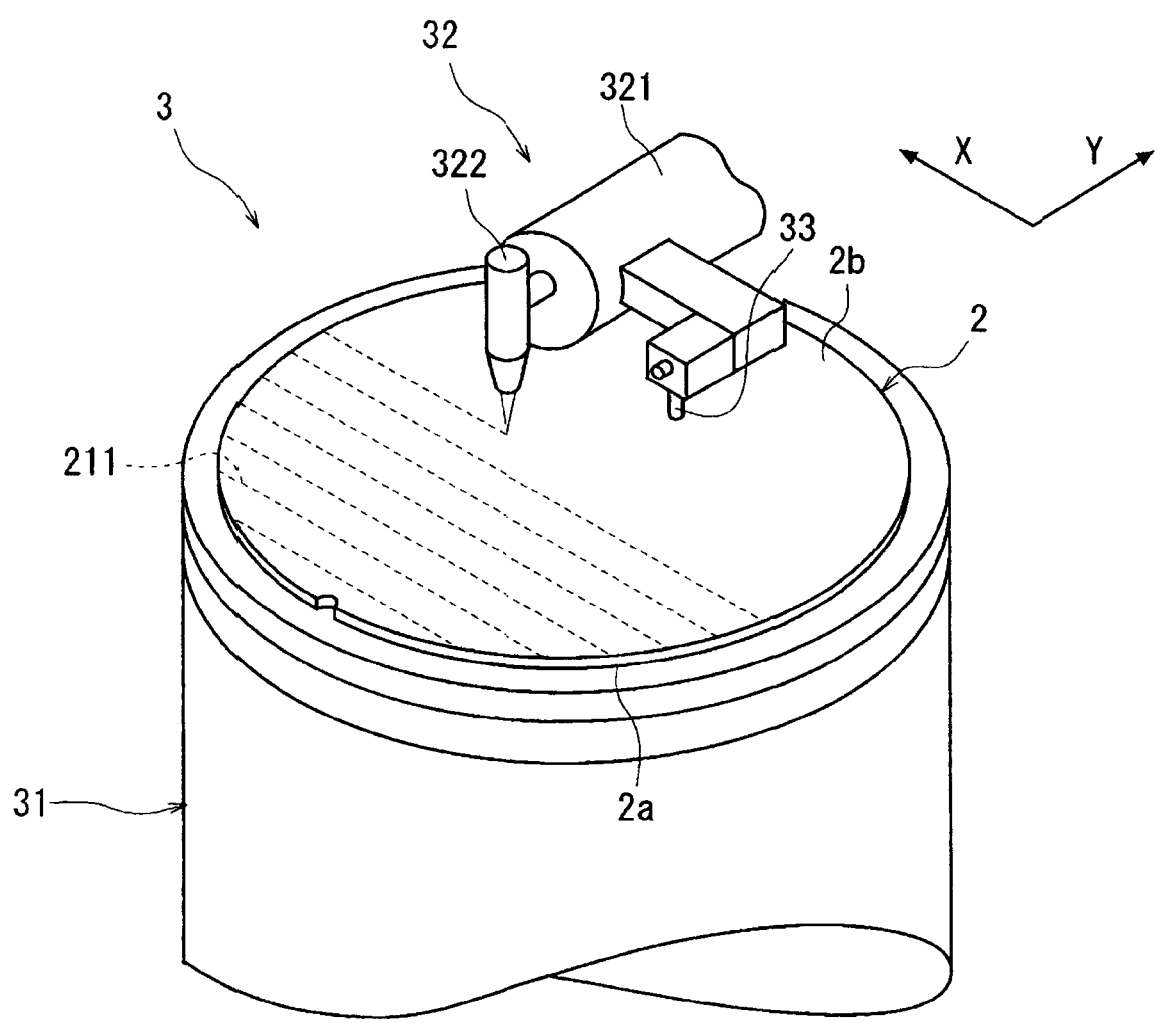
FIG. 2 is a perspective view of a major part of a laser beam processing apparatus for carrying out an altered layer forming step in a laser beam processing step in the method of processing an optical device wafer according to the invention.

Now, a laser beam processing step in which laser beam processing is applied to the optical device wafer 2 so as to form breakage starting points along the streets 21 by use of the above-mentioned laser beam processing apparatus 3 will be described below. A first embodiment of the laser beam processing step includes carrying out an altered layer forming step of forming an altered layer inside the optical device wafer 2 along the streets 21. To carry out the altered layer forming step, the optical device wafer 2 is put on the chuck table 31 of the laser beam processing apparatus 3, with its face-side surface 2a down, as shown in FIG. 2. Then, a suction means (not shown) is operated to suction hold the optical device wafer 2 onto the chuck table 31 (wafer holding step). Therefore, the optical device wafer 2 suction held on the chuck table 31 has its back-side surface 2b on the upper side.

After the wafer holding step is carried out as above-mentioned, an altered layer forming step is conducted in which the optical device wafer 2 is irradiated with a pulsed laser beam having such a wavelength as to be transmitted through the optical device wafer 2 from the back-side surface 2b side and along the streets 21 formed on the optical device wafer 2, thereby forming an altered layer inside the optical device wafer 2 along the streets 21. To carry out the altered layer forming step, first, the chuck table 31 with the optical device wafer 2 suction held thereon is positioned into a position just under the image pickup means 33 by a machining feeding means (not shown). Then, an alignment work is carried out in which a work region to be laser beam processed of the optical device wafer 2 is detected by the image pickup means 33 and the control means (not shown). Specifically, the image pickup means 33 and the control means (not shown) perform image processing such as pattern matching for matching the position of the street 21 formed on the optical device wafer 2 in a predetermined direction and the position of the condenser 322 of the laser beam irradiation means 32 for irradiation with the laser beam along the street 21, whereby alignment of the laser beam irradiation position is performed. In addition, alignment of the laser beam irradiation position is similarly performed also for the street 21 formed on the optical device wafer 2 to extend orthogonally to the predetermined direction (alignment step). In this case, the face-side surface 2a provided with the streets 21 of the optical device wafer 2 is located on the lower side. However, the image of the streets 21 can be picked up to the back-side surface 2b side in a see-through manner, since the image pickup means 33 has an image pickup means composed of the infrared illumination means, the optical system for catching infrared rays, the image pickup device (infrared CCD) for outputting an electrical signal corresponding to the infrared rays thus caught, and the like, as above-mentioned.

Figure 3A:
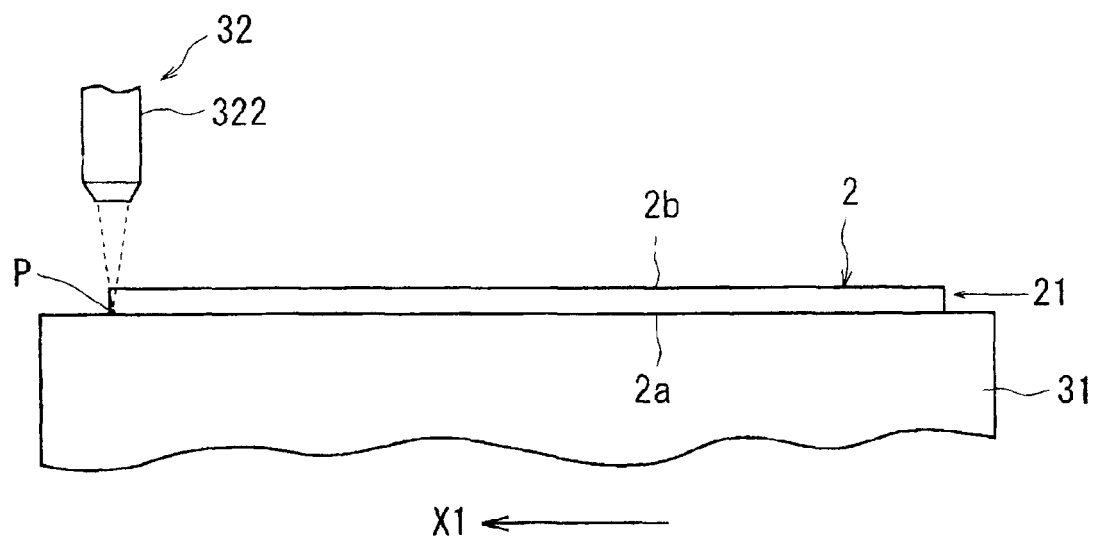
FIGS. 3A and 3B illustrate the altered layer forming step in the laser beam processing step in the method of dividing the optical device wafer according to the invention.
Figure 3B:
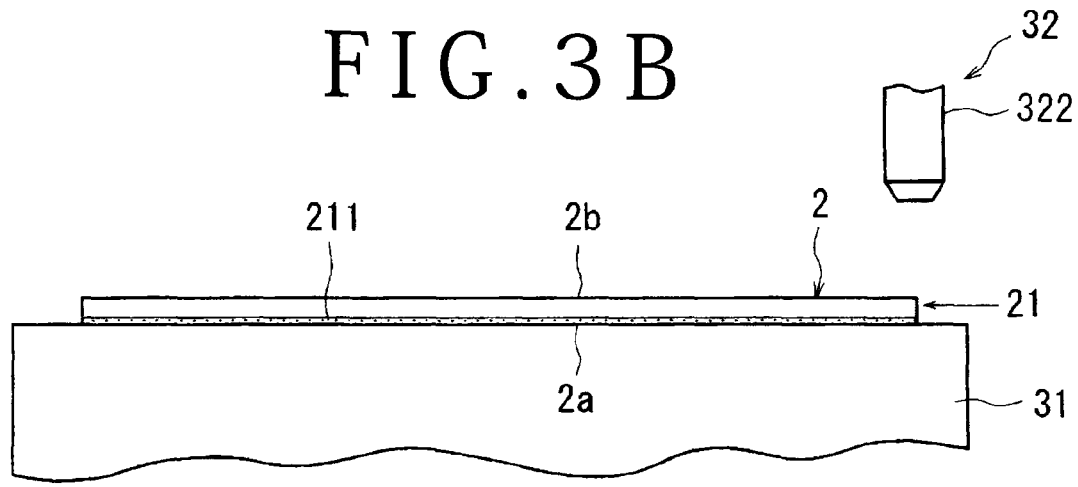

After the alignment step is conducted in this manner, the chuck table 31 is moved into a laser beam irradiation region in which the condenser 322 of the laser beam irradiation means 32 for irradiation with the laser beam is located, and one end (the left end, in FIG. 3A) of a predetermined street 21 is positioned into a position just under the condenser 322 of the laser beam irradiation means 32, as shown in FIG. 3A. Then, while irradiating the optical device wafer 2 with the pulsed laser beam having such a wavelength as to be transmitted through the optical device wafer 2 through the condenser 322, the chuck table 31 is moved at a predetermined feed rate in the direction of arrow X1 in FIG. 3A. Subsequently, when the irradiation position of the condenser 322 has reached the other end position of the street 21 as shown in FIG. 3B, the irradiation with the pulsed laser beam is stopped and the movement of the chuck table 31 is stopped. In the altered layer forming step, the condensing (converging) point P of the pulsed laser beam is positioned near the face-side surface 2a of the optical device wafer 2. As a result, an altered layer 211 is formed inside the optical device wafer 2, on the side of the face-side surface 2a, along the street 21.

The processing conditions in the altered layer forming step are set, for example, as follows.

| Light source: | Er pulsed laser |
|---|---|
| Wavelength: | 1560 nm |
| Repetition frequency: | 90 to 200 kHz |
| Mean output: | 0.8 to 1.2 W |
| Processing feed rate: | 100 to 300 mm/sec |

After the altered layer forming step has carried out along all the streets 21 extending in the predetermined direction of the optical device wafer 2, the chuck table 31 is turned by 90 degrees, and the altered layer forming step is carried out along each of the streets 21 extending orthogonally to the predetermined direction.

Figure 4:
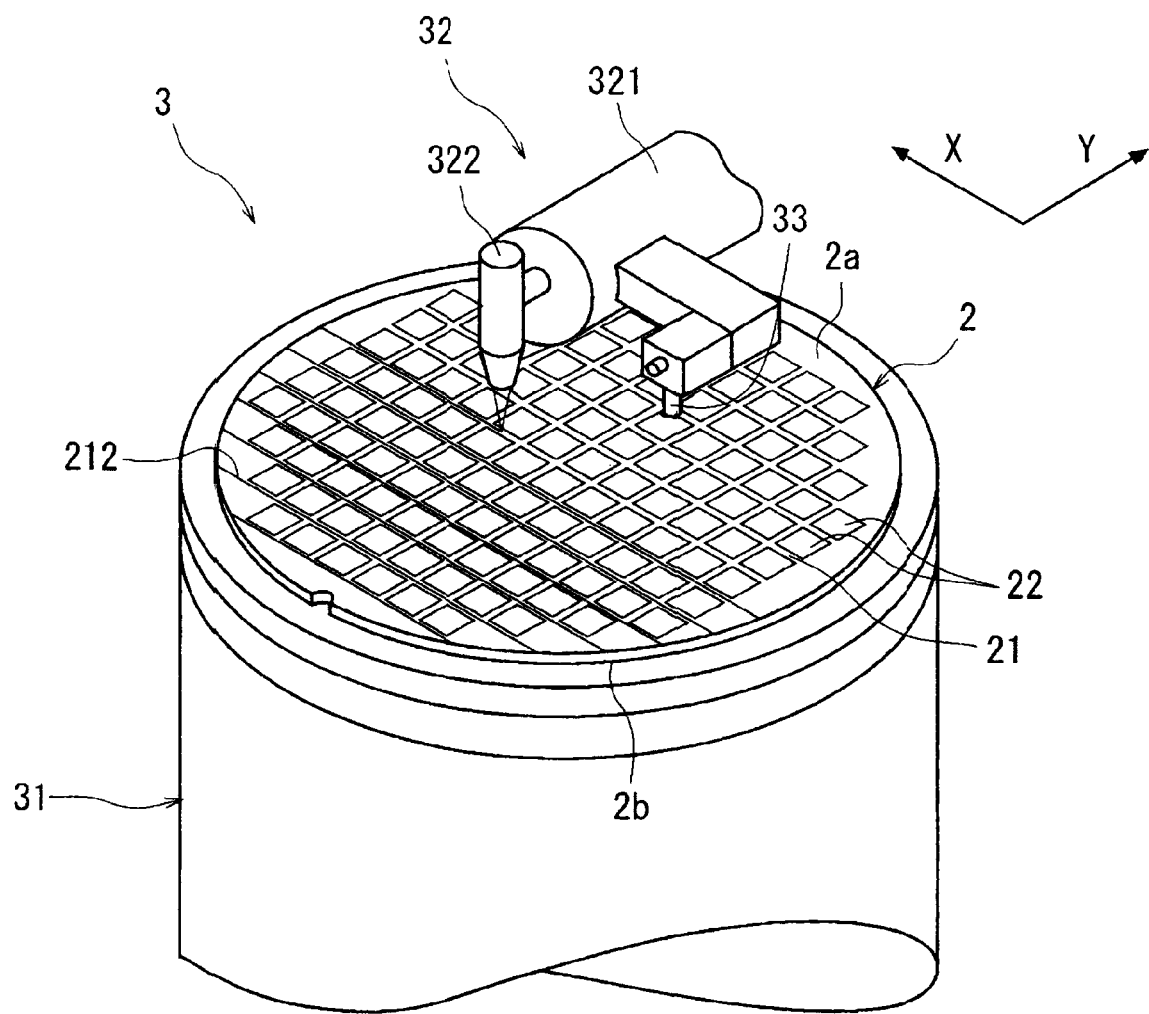
FIG. 4 is a perspective view of a major part of the laser beam processing apparatus for carrying a laser beam-machined groove forming step in the laser beam processing step in the method of processing an optical device wafer according to the invention.

Now, a second embodiment of the laser beam processing step for performing laser beam processing on the optical device wafer 2 to form the breakage starting points along the streets 21 will be described below, referring to FIGS. 4 to 5B. The second embodiment of the laser beam processing step includes performing a laser beam-machined groove forming step of forming laser beam-machined grooves in the face-side surface 2a of the optical device wafer 2 along the streets 21. Incidentally, the laser beam-machined groove forming step is carried out by use of a laser beam processing apparatus similar to the laser beam processing apparatus 3 shown in FIG. 2. To perform the laser beam-machined groove forming step, as shown in FIG. 4, the optical device wafer 2 is put on a chuck table 31 of the laser beam processing apparatus 3, with its back-side surface 2b down. Then, a suction means (not shown) is operated to hold the optical device wafer 2 onto the chuck table 31 by suction (wafer holding step). Therefore, the optical device wafer 2 suction held on the chuck table 31 has its face-side surface 2a on the upper side. After the wafer holding step is thus performed, an alignment step is carried out in the same manner as in the above-described altered layer forming step.

Figure 5A:
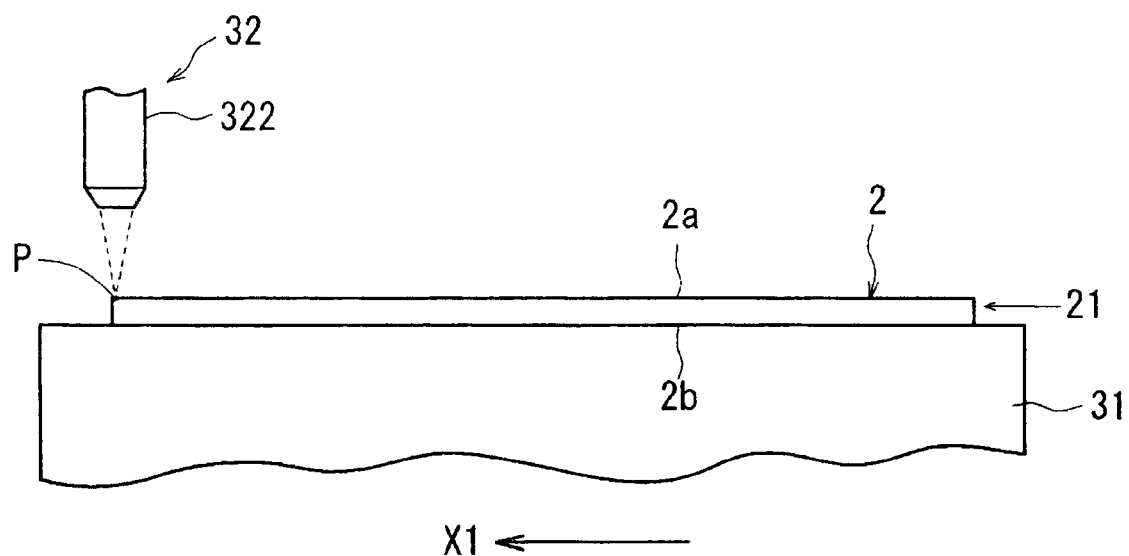
FIGS. 5A and 5B illustrate the laser beam-machined groove forming step in the laser beam processing step in the method of processing an optical device wafer according to the invention.
Figure 5B:
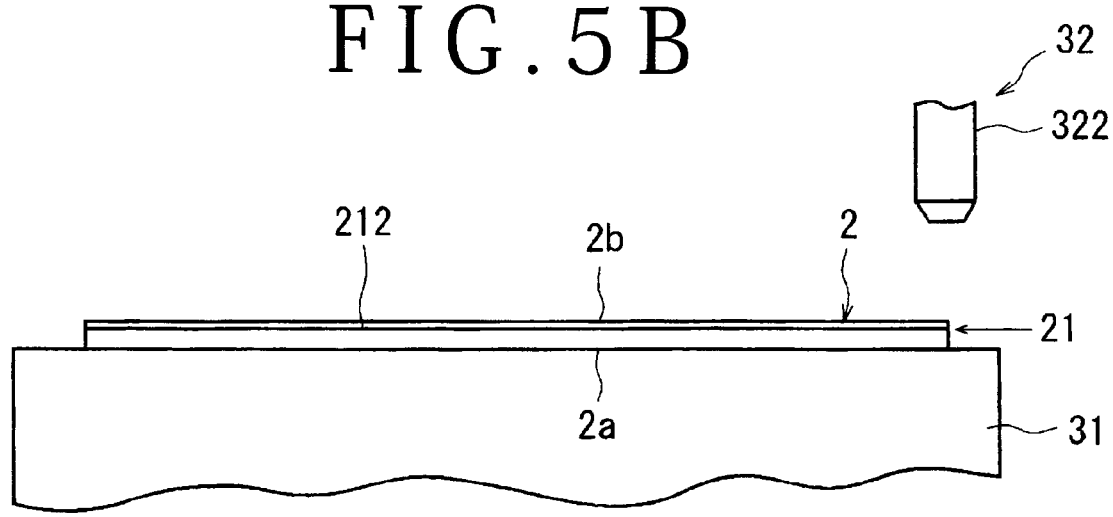

After the alignment step is conducted, the chuck table 31 is moved into a laser beam irradiation region in which a condenser 322 of a laser beam irradiation means 32 for irradiation with a laser beam is located, and one end (the left end, in FIG. 5A) of a predetermined street 21 is positioned into a position just under the condenser 322 of the laser beam irradiation means 32, as shown in FIG. 5A. Then, while irradiating the optical device wafer 2 with a pulsed laser beam having such a wavelength as to be absorbed in the optical device wafer 2 through the condenser 322, the chuck table 31 is moved at a predetermined feed rate in the direction of arrow X1 in FIG. 5A. Subsequently, when the irradiation position of the condenser 322 has reached the other end of the street 21 as shown in FIG. 5B, the irradiation with the pulsed laser beam is stopped and the movement of the chuck table 31 is stopped. In the laser beam-machined groove forming step, the condensing (converging) point P of the pulsed laser beam is positioned near the face-side surface 2a (upper surface) of the optical device wafer 2. As a result, a laser beam-machined groove 212 is formed in the face-side surface 2a of the optical device wafer 2 along the street 21.

The processing conditions in the laser beam-machined groove forming step as above are set, for example, as follows.

| | |
|---|---|
| Light source: | YAG pulsed laser |
| Wavelength: | 355 nm |
| Repetition frequency: | 90 to 200 kHz |
| Mean output: | 0.8 to 1.2 W |
| Processing feed rate: | 100 to 300 mm/sec |

After the laser beam-machined groove forming step is carried out along all the streets 21 extending in the predetermined direction of the optical device wafer 2, the chuck table 31 is turned by 90 degrees, and the laser beam-machined groove forming step is performed along each of the streets 2 extending orthogonally to the predetermined direction.

Figure 6A:
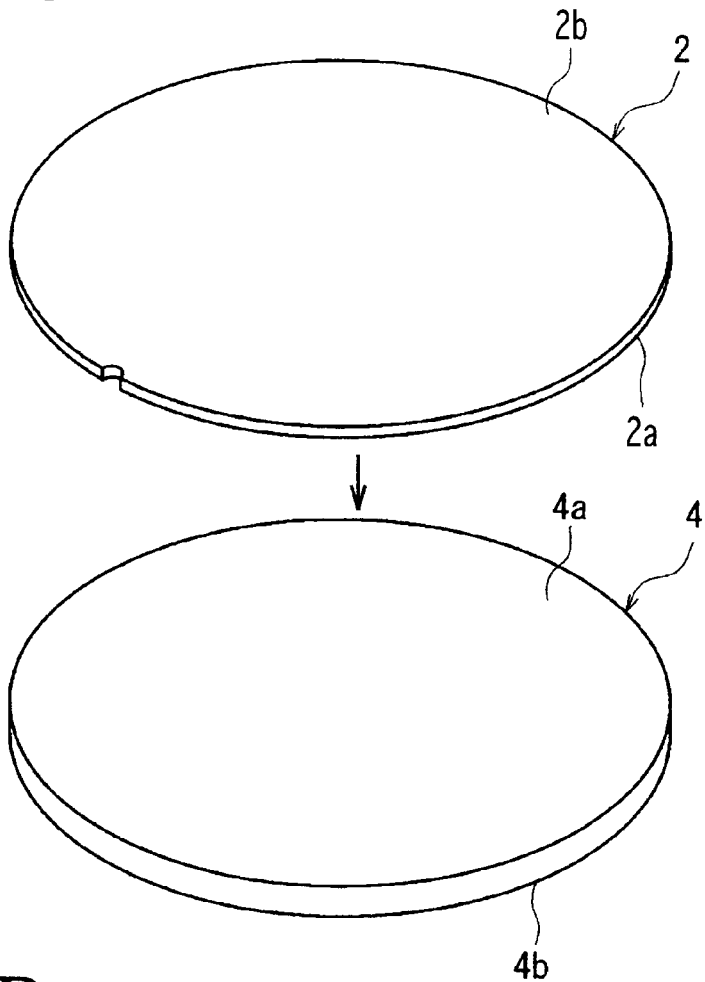
FIGS. 6A and 6B illustrate a protective plate bonding step in the method of processing an optical device wafer according to the invention.
Figure 6B:
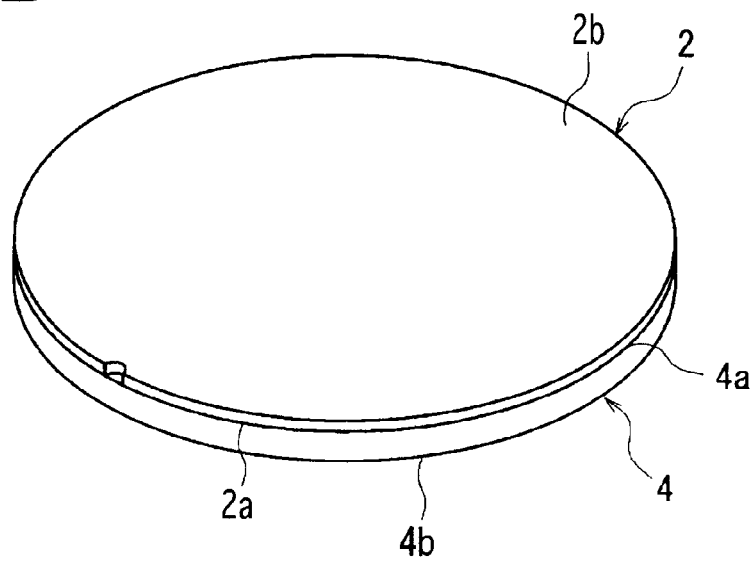

After the laser beam processing step as above is carried out, a protective plate bonding step is conducted in which the surface of the optical device wafer 2 is bonded to a surface of a highly rigid protective plate with a bonding agent permitting peeling. Specifically, as shown in FIGS. 6A and 6B, the face-side surface 2a of the optical device wafer 2 is bonded to the face-side surface 4a of the highly rigid protective plate 4 with a bonding agent permitting peeling. The protective plate 4 is formed in a circular disk shape from a high-rigidity material such as a glass substrate, with its face-side surface 4a and back-side surface 4b formed to be flat. Where the protective plate 4 is composed of a glass substrate, the thickness thereof is preferably about 2 mm. Incidentally, the material constituting the protective plate 4a is not limited to the glass substrate, and may be a ceramic, a metallic material such as stainless steel, a resin or the like. Besides, as the bonding agent which permits peeling, there can be used a wax melting at a temperature of 70° C., for example.

After the protective plate bonding step as above is conducted, a back side grinding step is carried out in which the back-side surface 2b of the optical device wafer 2 adhered to the protective plate 4 is ground so as to form the optical device wafer 2 to a finished thickness of the optical devices. The back side grinding step, in the embodiment shown, is carried out by performing a rough grinding step and a finish grinding step. The rough grinding step is performed by use of a grinder shown in FIG. 7. The grinder 5 shown in FIG. 7 has a chuck table 51 for holding the work, and a rough grinding means 52a for rough grinding of a work surface of the work held on the chuck table 51. The chuck table 51 holds the work on its upper surface by suction, and is rotated in the direction of arrow A in FIG. 7. The rough grinding means 52a includes a spindle housing 521a, a rotating spindle 522a which is rotatably supported by the spindle housing 521a and is rotated by a rotational driving mechanism (not shown), a mounter 523a attached to the lower end of the rotating spindle 522a, and a rough grinding wheel 524a mounted to a lower surface of the mounter 523a. The rough grinding wheel 524a is composed of a circular disk-shaped base 525a, and a plurality of rough grinding stones 526a mounted to a lower surface of the base 525a in an annular pattern, and the base 525a is attached to the lower surface of the mounter 523a by fastening bolts 527a. The rough grinding stones 526a, in the embodiment shown, are each a metal-bonded grindstone formed by sintering diamond abrasive grains having a grain diameter of around ϕ60 μm with a metal bond.

To perform the rough grinding step by use of the above-mentioned grinder 5, the optical device wafer 2 having been subjected to the protective plate bonding step as above is placed on the upper surface (holding surface) of the chuck table 51, with its protective plate 4 side down, and the optical device wafer 2 is suction held onto the chuck table 51 through the protective plate 4. Therefore, the optical device wafer 2 suction held on the chuck table 51 through the protective plate 4 has its back-side surface 2b on the upper side. After the optical device wafer 2 is thus suction held on the chuck table 51, the chuck table 51 is rotated at, for example, 300 rpm in the direction of arrow A. While the chuck table 51 is being thus rotated, the rough grinding wheel 524a of the rough grinding means 52a is rotated at, for example, 1000 rpm in the direction of arrow B and is brought into contact with the back-side surface 2b of the optical device wafer 2, and the rough grinding wheel 524a is put to downward grinding feed at a grinding feed rate of, for example, 0.025 mm/min, whereby rough grinding of the back-side surface 2b of the optical device wafer 2 is performed. In this rough grinding step, grinding water is supplied to the grinding area; in this case, the quantity of the grinding water supplied may be about 4 L/min. Incidentally, the grinding amount in the rough grinding step, in the embodiment shown, is set to 345 μm. Therefore, the thickness of the optical device wafer 2 upon the rough grinding step, in the embodiment shown, is 80 μm.

Figure 7:
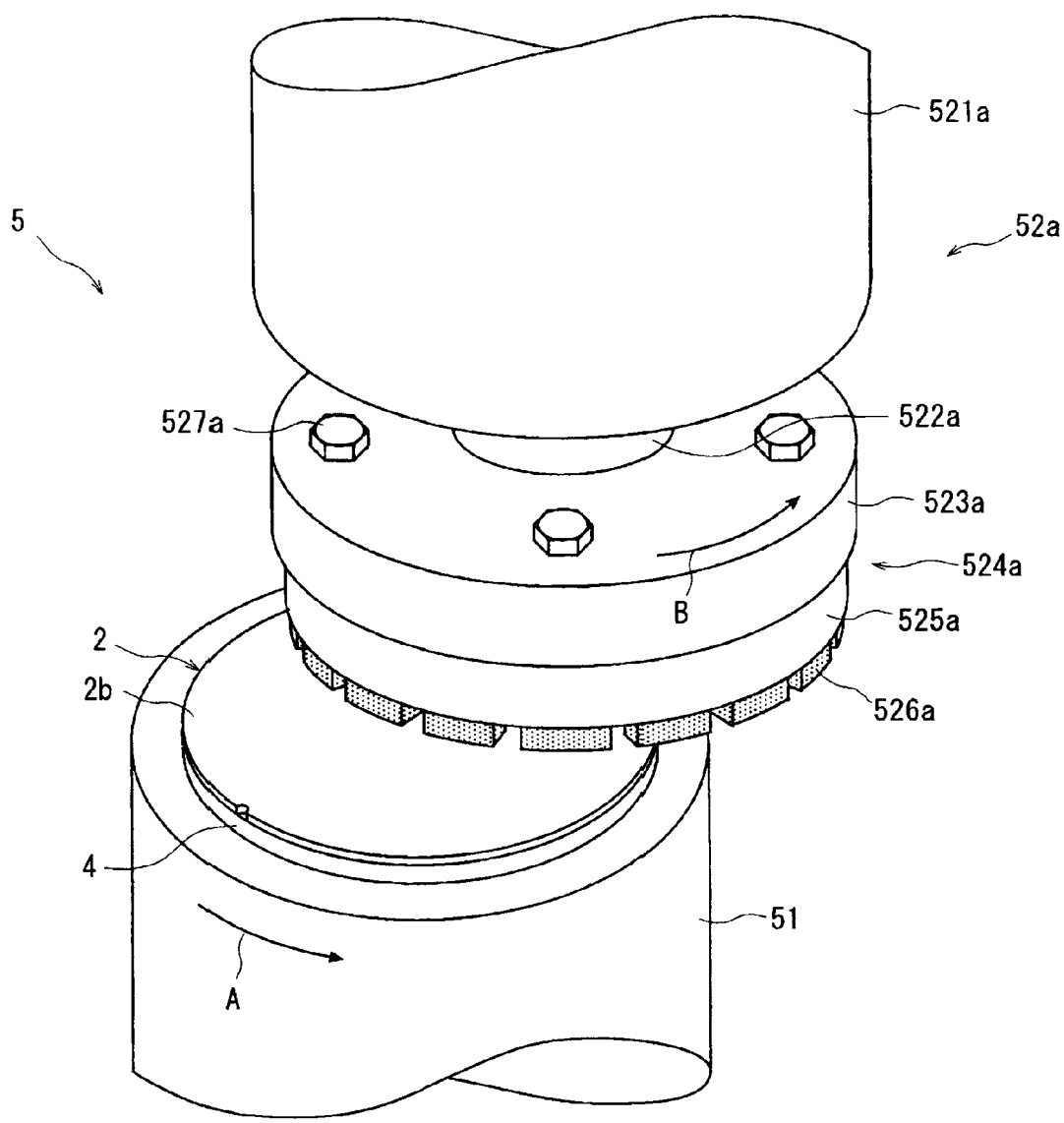
FIG. 7 illustrates a rough grinding step in a back side grinding step in the method of processing an optical device wafer according to the invention.
Figure 8:
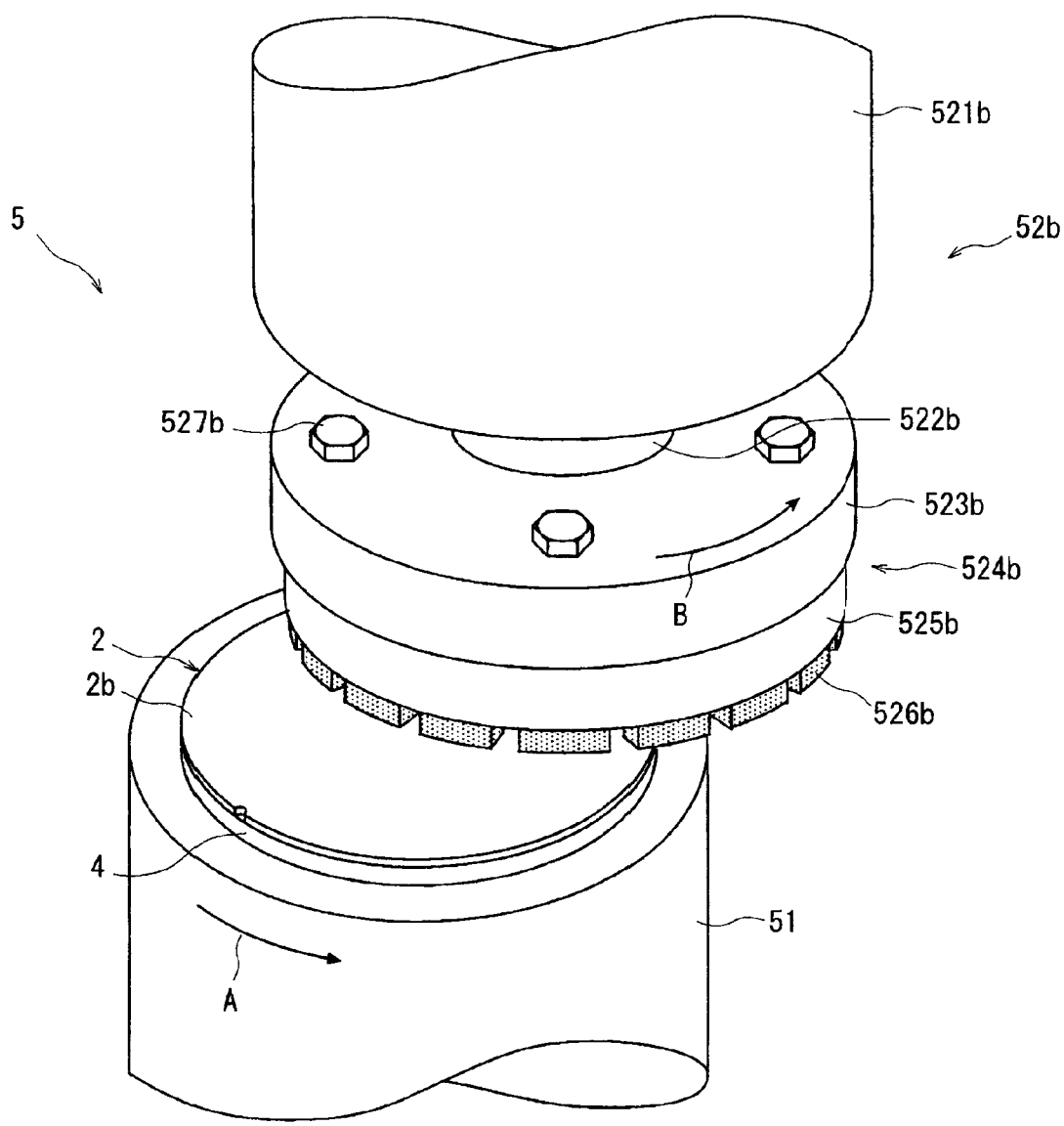
FIG. 8 illustrates a finish grinding step in the back side grinding step in the method of processing an optical device wafer according to the invention.

After the rough grinding step as above is conducted, a finish grinding step is carried out. As shown in FIG. 8, the finish grinding step is performed by use of a grinder 5 substantially the same as the grinder 5 shown in FIG. 7. Specifically, the grinder 5 shown in FIG. 8 has a chuck table 51, and a finish grinding means 52b for finish grinding of a work surface of the wafer held on the chuck table 51. The finish grinding means 52b includes a spindle housing 521b, a rotating spindle 522b which is rotatably supported by the spindle housing 521b and is rotated by a rotational driving mechanism (not shown), a mounter 523b attached to the lower end of the rotating spindle 522b, and a finish grinding wheel 524b mounted to a lower surface of the mounter 523b. The finish grinding wheel 524b includes a circular disk-shaped base 525b, and a plurality of finish grinding stones 526b mounted to a lower surface of the base 525b in an annular pattern, and the base 525b is attached to the lower surface of the mounter 523b by fastening bolts 527b. The finish grinding stones 526b, in the embodiment shown, are each composed of a resin-bonded grindstone obtained by sintering diamond abrasive grains having a grain diameter of around ϕ10 μm with a resin bond. The finish grinding means 52b thus configured is in general disposed in the same grinder as that for the rough grinding means 52a, and the chuck table 51 holding thereon the work rough-ground by the rough grinding means 52a is moved into the machining zone of the finish grinding means 52b.

Now, the finish grinding step carried out by use of the above-mentioned finish grinding means 52b will be described below referring to FIG. 8. The chuck table 52 holding thereon the optical device wafer 2 having been subjected to the rough grinding step by the rough grinding means 52a is moved into the machining zone of the finish grinding means 52b shown in FIG. 8. After the chuck table 52 is moved into the machining zone shown in FIG. 8, the chuck table 51 is rotated at, for example, 300 rpm in the direction of arrow A. While the chuck table 51 is thus being rotated, the finish grinding wheel 524b of the finish grinding means 52b is rotated at, for example, 1500 rpm and brought into contact with the back-side surface 2b of the optical device wafer 2, and the finish grinding wheel 524b is put to downward grinding feed at a grinding feed rate of, for example, 0.009 mm/min, whereby finish grinding of the back-side surface 2b of the optical device wafer 2 is performed. In this finish grinding step, grinding water is supplied to the grinding area; in this case, the quantity of the grinding water supplied may be about 4 L/min. Incidentally, the grinding amount in the finish grinding step, in the embodiment shown, is set to 55 μm. Therefore, the thickness of the optical device wafer 2 upon the finish grinding step, in the embodiment shown, is 25 μm.

The optical device wafer 2 having been subjected to the back side grinding step composed of the rough grinding step and the finish grinding step has an extremely small thickness of 25 μm, but it would not be cracked, since it is bonded to the highly rigid protective plate 4. Incidentally, it may be contemplated to carry out the above-mentioned laser beam processing step after the thickness of the optical device wafer 2 is reduced to the finished thickness of the optical devices by performing the above-mentioned back side grinding step. However, when the thickness of the optical device wafer 2 is reduced to an extremely small value of, for example, 25 μm, it is difficult, particularly in the altered layer forming step, to position the condensing (converging) point P of the laser beam in the inside of the optical device wafer 2. Therefore, the laser beam processing step is carried out in the condition where the optical device wafer 2 is thick, before performing the back side grinding step.

Figure 9:
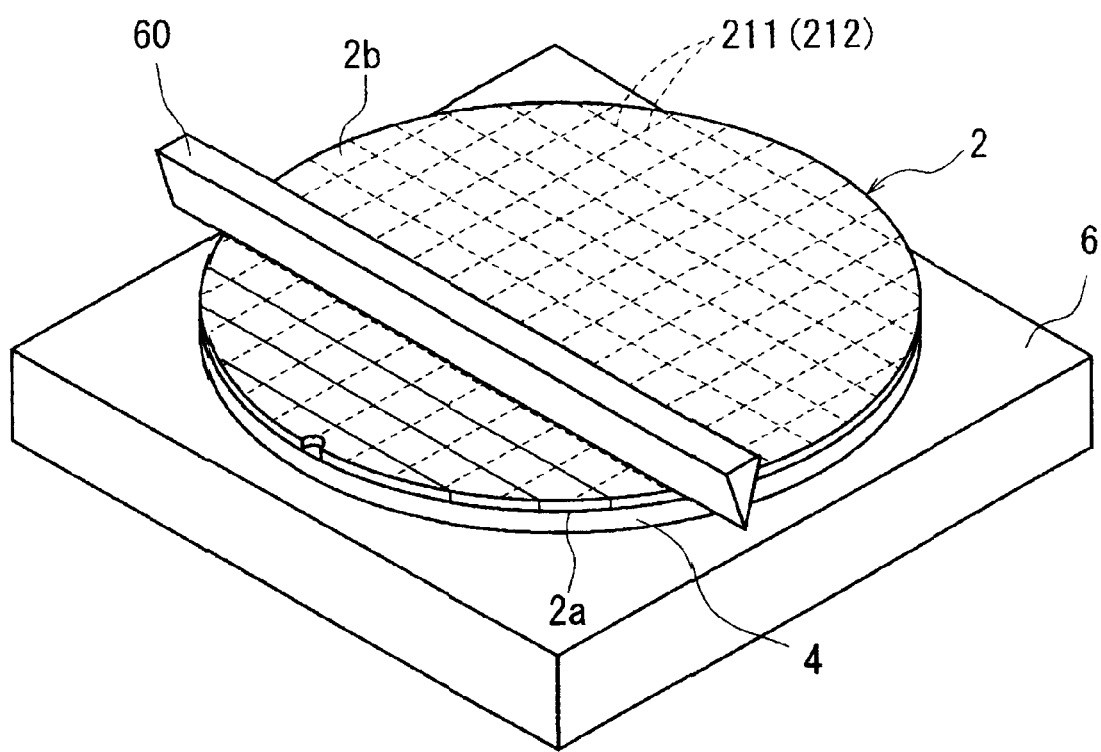
FIG. 9 illustrates a first embodiment of a wafer dividing step in the method of processing an optical device wafer according to the invention.

After the above-mentioned back side grinding step is performed, a wafer dividing step is carried out in which an external force is exerted on the optical device wafer 2 so as to break up the optical device wafer 2 along the streets 21 along which the breakage starting points have been formed, thereby dividing the optical device wafer 2 into the individual optical devices. To carry out the wafer dividing step, as shown in FIG. 9, the optical device wafer 2 having been subjected to the back side grinding step is mounted on a support base 6, with its protective plate 4 side down. Then, an edge line of an external force applying member 60 rectangular in cross section is positioned along the street 21, along which the altered layer 211 or the laser beam-machined groove 212 has been formed to function as breakage starting points, from the back-side surface 2b side of the optical device wafer 2, and the external force applying member 60 is pressed against the optical device wafer 2, whereby the optical device wafer 2 is broken up along the street 21 (breaking-up step). This breaking-up step is carried out along all the streets of the optical device wafer 2 along which the altered layer 211 or the laser beam-machined grooves 212 have been formed to function as the breakage starting points, whereby the optical device wafer 2 is divided along the streets 21 into the individual optical devices 22.

Figure 10A:
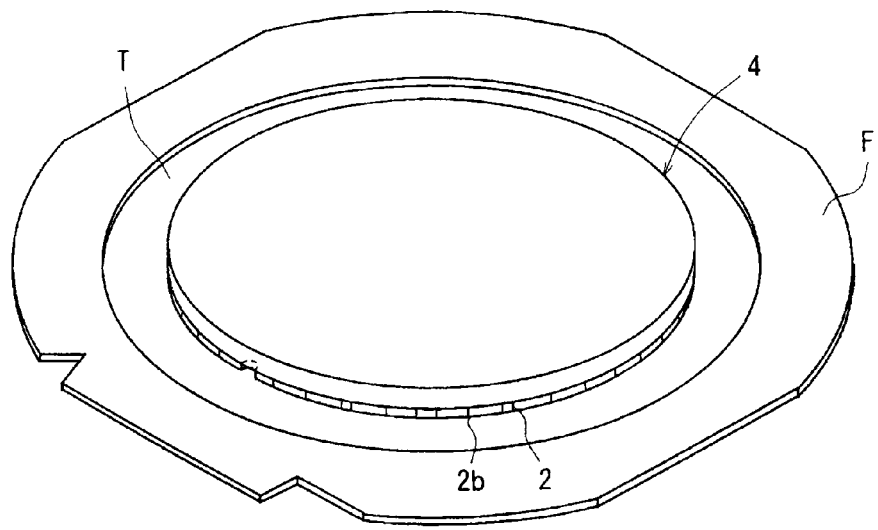
FIGS. 10A and 10B illustrate a first embodiment of a wafer supporting step in the method of processing an optical device wafer according to the invention.
Figure 10B:
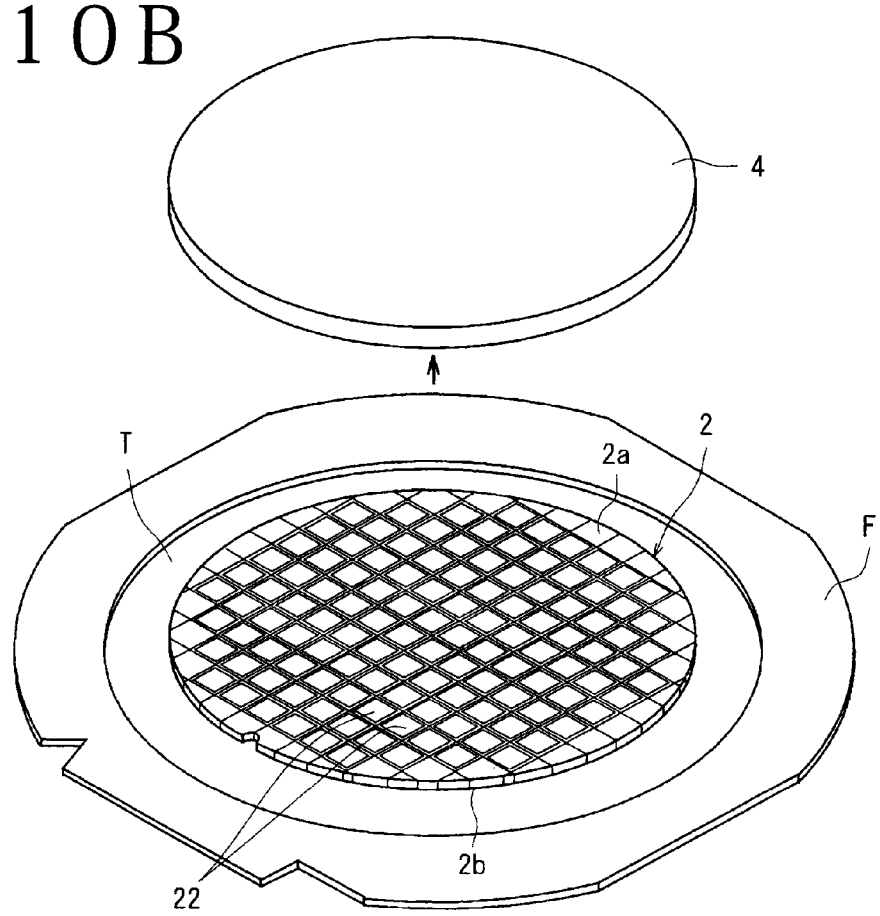
Figure 11:
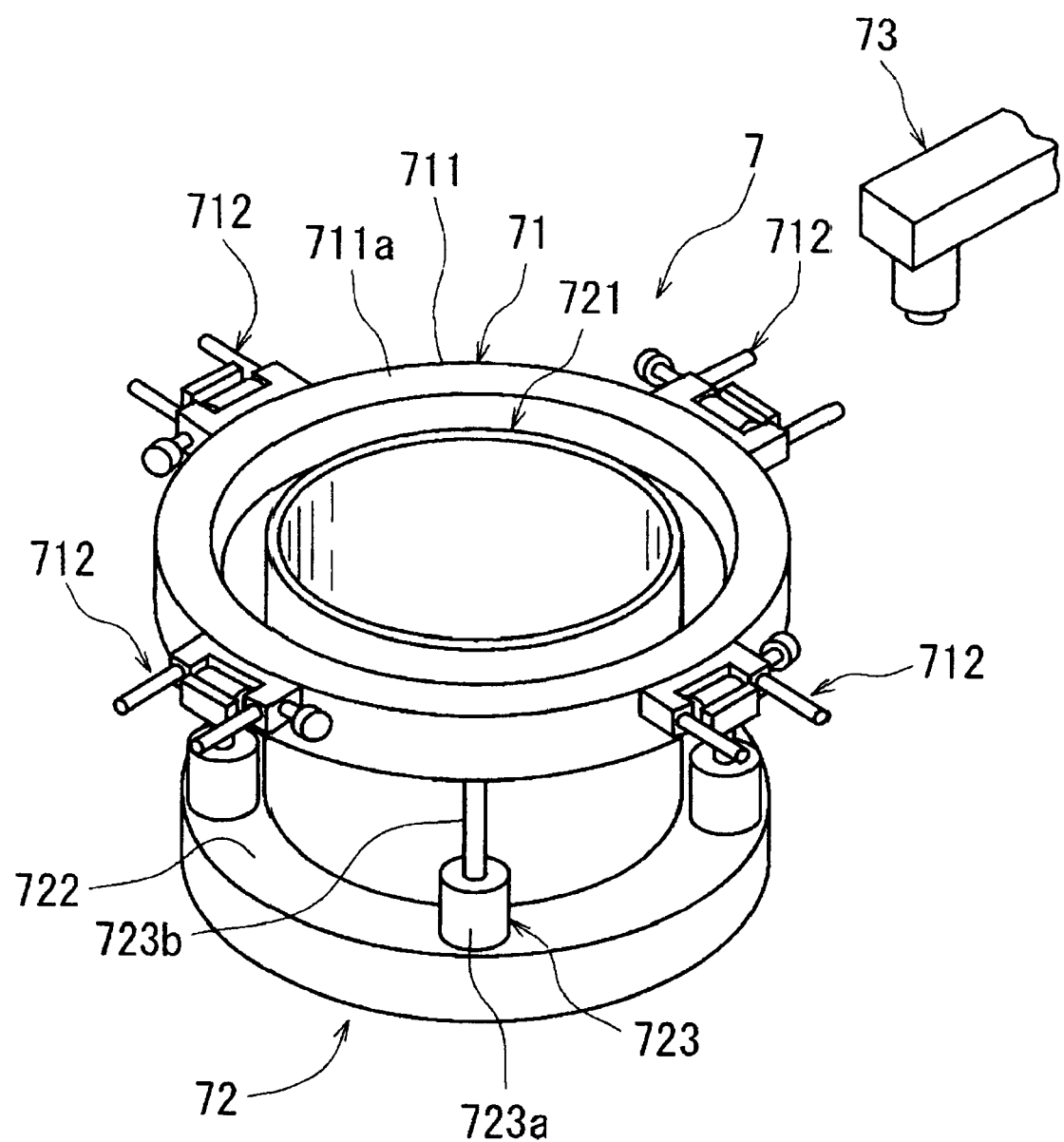
FIG. 11 is a perspective view of a pick-up device for carrying out a picking-up step in the method of processing an optical device wafer according to the invention.

Next, a wafer supporting step is carried out in which the back-side surface of the optical device wafer 2 having been subjected to the wafer dividing step and divided into the individual optical devices 22 is adhered to the face-side surface of a dicing tape, and the protective plate 4 adhered to the face side of the optical device wafer 2 is peeled off. Specifically, as shown in FIG. 10A, the back-side surface 2b of the optical device wafer 2 is adhered to the face-side surface of the dicing tape T attached to an annular frame F (dicing tape adhering step). Then, as shown in FIG. 10B, the protective plate 4 adhered to the face-side surface 2a of the optical device wafer 2 is peeled off (protective plate peeling step). In this case, the wax bonding the optical device wafer 2 and the protective plate 4 to each other is melted by heating the protective plate 4 to about 70° C., so that the protective plate 4 can be easily peeled from the optical device wafer 2.

After the above-mentioned wafer supporting step is conducted, a picking-up step is carried out in which the individually divided optical devices 22 adhered to the dicing tape T are picked up by peeling them from the dicing tape T. This picking-up step is performed by use of a picking-up device 7 shown in FIG. 11. The picking-up device 7 shown in FIG. 11 includes a frame holding means 71 for holding the annular frame F, a tape expanding means 72 for expanding the dicing tape T attached to the annular frame F held by the frame holding means 71, and a pick-up collet 73. The frame holding means 71 is composed of an annular frame holding member 711, and a plurality of clamps 712 as fixing means disposed at the outer periphery of the frame holding member 711. An upper surface of the frame holding member 711 forms a mount surface 711a on which to mount the annular frame F, and the annular frame F is mounted on the mount surface 711a. Then, the annular frame F mounted on the mount surface 711a is fixed to the frame holding member 711 by the clamps 712. The frame holding means 71 configured in this manner is so supported that it can be advanced and retracted in the vertical direction by the tape expanding means 72.

Figure 12A:
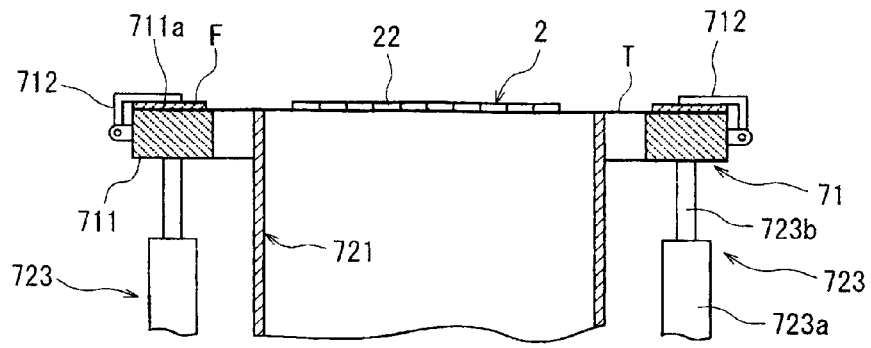
FIGS. 12A to 12C illustrate the picking-up step in the method of processing an optical device wafer according to the invention.
Figure 12B:
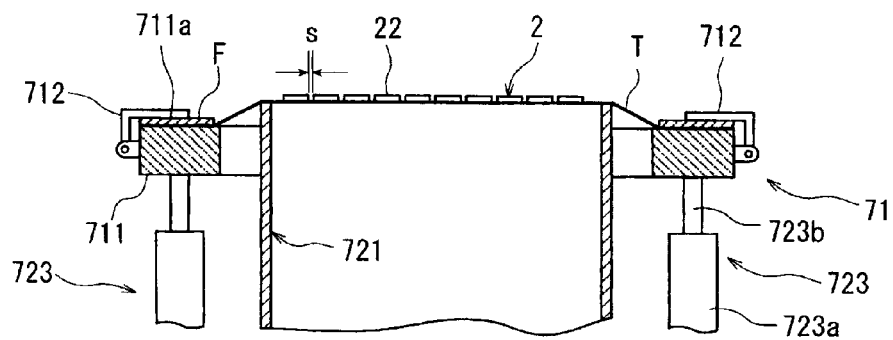

The tape expanding means 72 has an expansion drum 721 disposed on the inside of the annular frame holding member 711. The expansion drum 721 has an inside diameter and an outside diameter which are smaller than the inside diameter of the annular frame F and larger than the outside diameter of the optical device wafer 2 adhered to the dicing tape T attached to the annular frame F. In addition, the expansion drum 721 has a support flange 722 at the lower end thereof. The tape expanding means 72, in the embodiment shown, has a support means 723 by which the annular frame holding member 711 can be advanced and retracted in the vertical direction. The support means 723 is composed of a plurality of air cylinders 723a disposed on the support flange 722, and piston rods 723b thereof are connected to a lower surface of the annular frame holding member 711. The support means 723 thus composed of the plurality of air cylinders 723a moves the annular frame holding member 711 between a reference position where the mount surface 711a is at substantially the same height as the upper end of the expansion drum 721 as shown in FIG. 12A and an expansion position where the mount surface 711a is a predetermined amount lower than the upper end of the expansion drum 721 as shown in FIG. 12B.

Figure 12C:
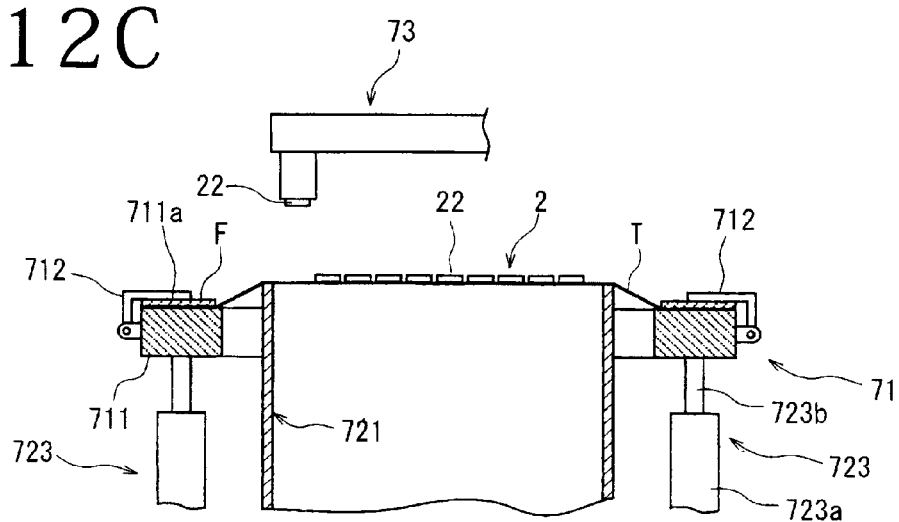

The picking-up step carried out using the picking-up device 7 configured as above will be described referring to FIGS. 12A to 12C. Specifically, the annular frame F to which the dicing tape T with the optical device wafer 2 (having been divided along the streets 21 into the individual optical device 22) adhered thereto is attached is mounted on the mount surface 711a of the frame holding member 711 constituting the frame holding means 71 as shown in FIG. 12A, and is fixed to the frame holding member 711 by the clamps 712. In this instance, the frame holding member 711 is positioned in the reference position shown in FIG. 12A. Next, the plurality of air cylinders 723a as the support means 723 constituting the tape expanding means 72 are operated so as to lower the annular frame holding member 711 to the expansion position shown in FIG. 12B. Therefore, the annular frame F fixed to the mount surface 711a of the frame holding member 711 is also lowered, so that dicing tape T attached to the annular frame F is brought into contact with the upper end edge of the expansion drum 721 and is expanded, as shown in FIG. 12B. As a result, the portions between the optical devices 22 adhered to the dicing tape T are widened, namely, the gaps S are enlarged. Subsequently, as shown in FIG. 12C, the pick-up collet 73 is operated to suck the optical device 22, to pick up the optical device 22 by peeling it from the dicing tape T, and to feeds the optical device 22 onto a tray (not shown). In the just-mentioned picking-up step, the gaps S between the optical devices 22 have been enlarged as above-mentioned, so that each optical device 22 can be easily picked up without interfering with the adjacent optical devices 22.

Now, a second embodiment of the method of processing an optical wafer device for dividing the optical device wafer 2 shown in FIG. 1 along the streets 21 into the individual optical devices 22 will be described below. The second embodiment involves a wafer dividing step and a wafer supporting step different from those in the above-described first embodiment, but the other steps therein are the same as those in the first embodiment. Therefore, also in the second embodiment, first, as shown in FIGS. 2 to 5B, a laser beam processing step is carried out in which the optical device wafer 2 is irradiated with a laser beam along the streets 21 to perform laser beam processing on the optical device wafer 2 to form breakage starting points along the streets 21. Then, as shown in FIGS. 6A and 6B, a protective plate bonding step is carried out in which the face-side surface of the optical device wafer 2 is bonded to a surface of a highly rigid protective plate with a bonding agent permitting peeling. Further, as shown in FIGS. 7 and 8, the back-side surface 2b of the optical device wafer 2 bonded to the protective plate 4 is ground so as to form the optical device wafer 2 to a finished thickness of the optical devices.

Figure 13A:
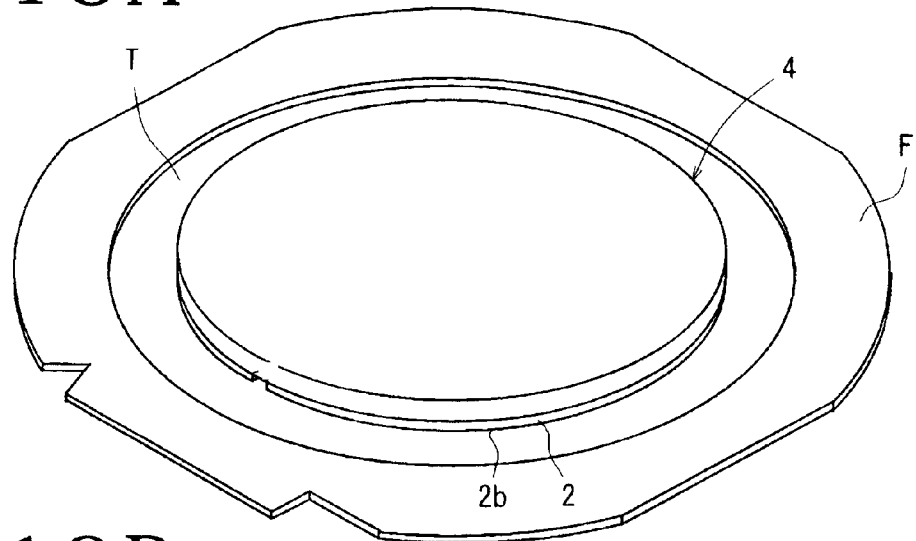
FIGS. 13A and 13B illustrate a second embodiment of the wafer supporting step in the method of processing an optical device wafer according to the invention.
Figure 13B:
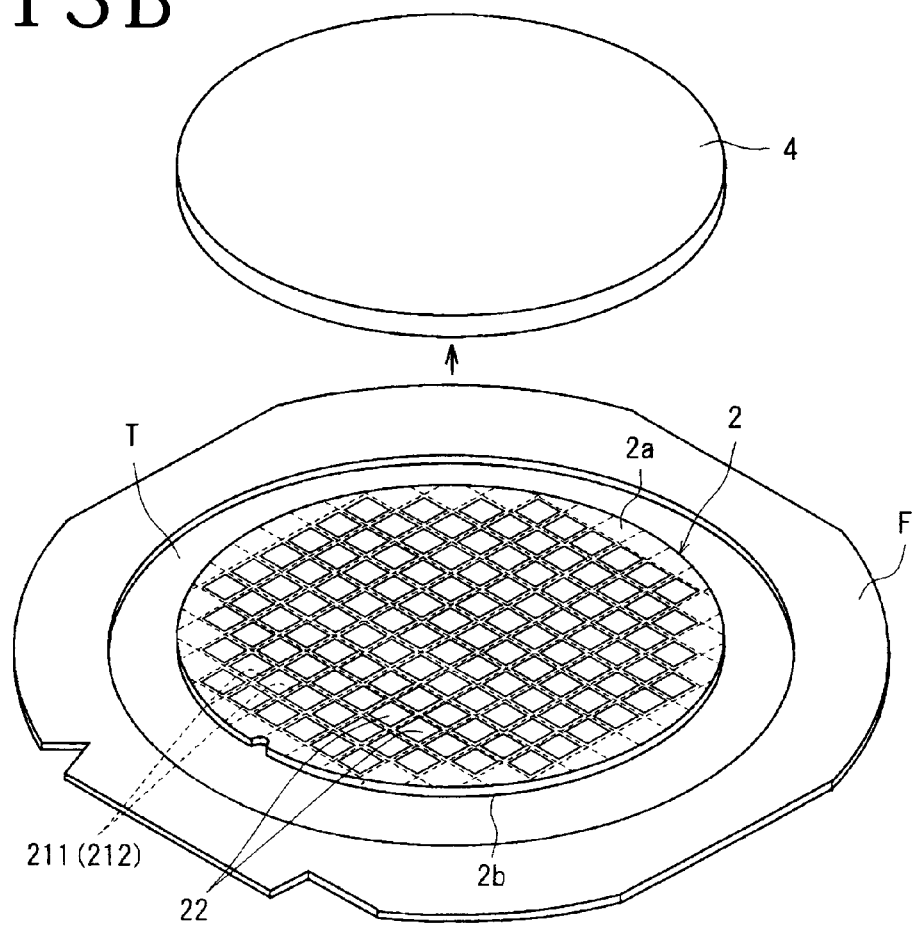

After the laser beam processing step and the protective plate bonding step and the back side grinding step are carried out as above-described, in the second embodiment, a wafer supporting step is performed in which the back-side surface of the optical device wafer 2 having been subjected to the back side grinding step is adhered to the face-side surface of a dicing tape, and the protective plate 4 bonded to the face-side surface of the optical device wafer 2 is peeled off. To be more specific, as shown in FIG. 13A, the back-side surface 2b of the optical device wafer 2 having been subjected to the back side grinding step is adhered to the face-side surface of the dicing tape T attached to the annular frame F (dicing tape adhering step). Then, as shown in FIG. 13B, the protective plate 4 bonded to the face-side surface 2a of the optical device wafer 2 is peeled off (protective plate peeling step). In this instance, the protective plate 4 is heated to about 70° C. to thereby melt the wax with which the optical device wafer 2 and the protective plate 4 are bonded to each other, so that the protective plate 4 can be easily peeled from the optical device wafer 2.

Figure 14A:
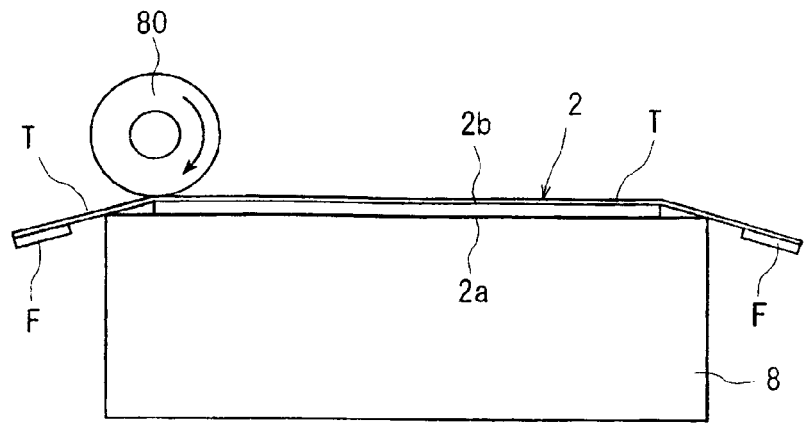
FIGS. 14A to 14C illustrate a second embodiment of the wafer dividing step in the method of processing an optical device wafer according to the invention.
Figure 14B:
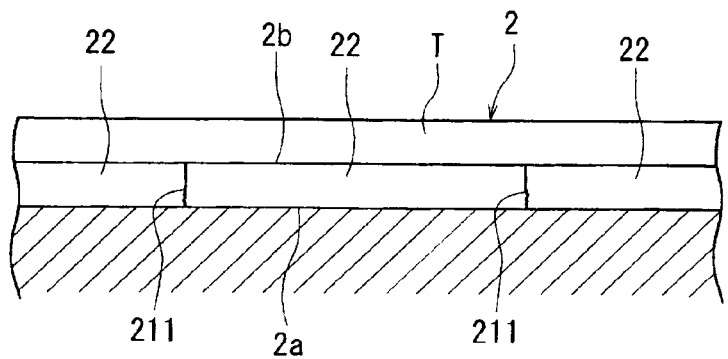
Figure 14C:
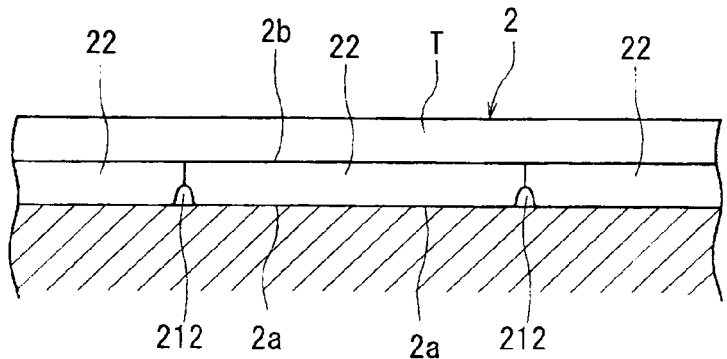

Next, a wafer dividing step is carried out in which an external force is exerted on the optical device wafer 2 having been subjected to the wafer supporting step so as to break up the optical device wafer 2 along the streets 21 along which the breakage starting points have been formed, whereby the optical device wafer 2 is divided into the individual optical devices. To perform the wafer dividing step, for example, as shown in FIG. 14A, the optical device wafer 2 of which the back-side surface 2b is adhered to the face-side surface of the dicing tape T is mounted on a flexible rubber sheet 8, with its face-side surface 2a down. Therefore, the dicing tape T adhered to the optical device wafer 2 is on the upper side. Then, a pressure roller 80 is rolled on the upper surface of the dicing tape T while pressing against the latter, whereby the optical device wafer 2 is broken up along the streets 21 while the altered layer 211 or the laser beam-machined grooves 212 are functioning as breakage starting points, as shown in FIGS. 14B and 14C. Incidentally, since the back-side surfaces of the individually divided optical devices 22 are being adhered to the dicing tape T, the optical devices 22 would not be scattered, and the form of the optical device wafer 2 is maintained.

After the above-mentioned wafer dividing step is performed, a picking-up step is carried out in which, as shown in FIGS. 11 and 12A to 12C in the first embodiment above, the individually divided optical devices 22 remaining adhered to the dicing tape T are picked up by peeling them from the dicing tape T.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of processing an optical device wafer, for dividing an optical device wafer which has optical devices formed in a plurality of regions demarcated by a plurality of streets formed in a grid pattern on a face-side surface thereof, along said plurality of streets into the individual optical devices, said method comprising:
    a laser beam processing step of irradiating said optical device wafer with a laser beam along said streets so as to perform laser beam processing on the face side of said optical device wafer, thereby forming breakage starting points along said streets;
    a protective plate bonding step of bonding the face side of said optical device wafer having been subjected to said laser beam processing step to a surface of a highly rigid protective plate with a bonding agent permitting peeling;
    a back side grinding step of grinding a back side of said optical device wafer adhered to said protective plate to form said optical device wafer to a finished thickness of said optical devices;
    a wafer dividing step of exerting an external force on said optical device wafer having been subjected to said back side grinding step so as to break up said optical device wafer along said streets along which said breakage starting points have been formed, thereby dividing said optical device wafer into the individual optical devices;
    a wafer supporting step of adhering a back-side surface of said optical device wafer having been subjected to said wafer dividing step and having been divided into the individual optical devices to a surface of a dicing tape, and peeling said protective plate adhered to the face side of said optical device wafer; and
    a picking-up step of picking up the individually divided optical devices adhered to said dicing tape.

2. The method of processing an optical device wafer according to claim 1, wherein said laser beam processing step comprises irradiating said optical device wafer with a laser beam having such a wavelength as to be transmitted through said optical device wafer while adjusting a focal point position of said laser beam to the inside of said optical device wafer, thereby to form an altered layer as said breakage starting points inside said optical device wafer along said streets.

3. The method of processing an optical device wafer according to claim 1, wherein said laser beam processing step comprises irradiating said optical device wafer with a laser beam having such a wavelength as to be absorbed in said optical device wafer, thereby to form laser beam-machined grooves as said breakage starting points in said face-side surface of said optical device wafer along said streets.

4. A method of processing an optical device wafer, for dividing an optical device wafer which has optical devices formed in a plurality of regions demarcated by a plurality of streets formed in a grid pattern on a face-side surface thereof, along said plurality of streets into the individual optical devices, said method comprising:
    a laser beam processing step of irradiating said optical device wafer with a laser beam along said streets so as to perform laser beam processing on the face side of said optical device wafer, thereby forming breakage starting points along said streets;

a protective plate bonding step of bonding the face side of said optical device wafer having been subjected to said laser beam processing step to a surface of a highly rigid protective plate with a bonding agent permitting peeling;

a back side grinding step of grinding a back side of said optical device wafer adhered to said protective plate to form said optical device wafer to a finished thickness of said optical devices;

a wafer supporting step of adhering a back-side surface of said optical device wafer having been subjected to said back side grinding step to a surface of a dicing tape, and peeling said protective plate adhered to the face side of said optical device wafer;

a wafer dividing step of exerting an external force on said optical device wafer having been subjected to said wafer supporting step so as to break up said optical device wafer along said streets along which said breakage starting points have been formed, thereby dividing said optical device wafer into the individual optical devices; and a picking-up step of picking up the individually divided devices adhered to said dicing tape.

5. The method of processing an optical device wafer according to claim 4, wherein said laser beam processing step comprises irradiating said optical device wafer with a laser beam having such a wavelength as to be transmitted through said optical device wafer while adjusting a focal point position of said laser beam to the inside of said optical device wafer, thereby to form an altered layer as said breakage starting points inside said optical device wafer along said streets.

6. The method of processing an optical device wafer according to claim 4, wherein said laser beam processing step comprises irradiating said optical device wafer with a laser beam having such a wavelength as to be absorbed in said optical device wafer, thereby to form laser beam-machined grooves as said breakage starting points in said face-side surface of said optical device wafer along said streets.

* * * * *